United States Patent [19]
Mueller et al.

[11] Patent Number: 4,668,708
[45] Date of Patent: May 26, 1987

[54] PROCESS FOR THE PREPARATION OF ELASTIC POLYURETHANE FLEXIBLE FOAMS USABLE IN COLD-MOLD TECHNIQUES TO PRODUCE MOLDED ARTICLES

[75] Inventors: Gerhard Mueller, Germering; Matthias Marx, Bad Durkheim; Wolfgang Jarre, Gruenstadt; Edwin Baumann, Schifferstadt; Ingolf Buethe, Boehl-Iggelheim, all of Fed. Rep. of Germany

[73] Assignee: BASF Aktiengesellschaft, Ludwigshafen, Fed. Rep. of Germany

[21] Appl. No.: 869,199

[22] Filed: May 30, 1986

[30] Foreign Application Priority Data

Jun. 1, 1985 [DE] Fed. Rep. of Germany ....... 3519692

[51] Int. Cl.$^4$ .............................................. C08G 18/14
[52] U.S. Cl. ..................................... 521/159; 521/914
[58] Field of Search ................................ 521/159, 914

[56] References Cited

U.S. PATENT DOCUMENTS

4,559,366 12/1985 Hostettler ........................... 521/159

Primary Examiner—Maurice J. Welsh
Attorney, Agent, or Firm—Joseph D. Michaels

[57] ABSTRACT

The invention is a process for the preparation of elastic polyurethane flexible foams having densities from approximately 25 to 60 kg/m$^3$, and producing molded articles in closed molds at temperatures from 25° to 80° C., comprising reacting (A) an organic polyisocyanate prepolymer having an isocyanate content from 6 to 20 percent by weight prepared by reacting a toluene diisocyanate and/or a diphenylmethane diisocyanate with a di- to tetrafunctional polyether polyol having a hydroxyl number from 20 to 50 and oxyethylene terminal group content of at least 10 to 30 percent by weight (B) a mixture of compounds containing reactive hydrogen atoms, comprising a mixture of
 (a) from 55 to 89.5 parts by weight of at least one di- to tetrafunctional polyether polyol having a hydroxyl number of from 20 to 80 and less than 10 percent by weight terminal oxyethylene groups,
 (b) from 0.5 to 20 parts by weight of at least one alkanolamine, and
 (c) from 10 to 25 parts by weight water, in the presence of (C) a blowing agent,
(D) a catalyst, and optionally
(E) auxiliaries and/or additives.

11 Claims, No Drawings

PROCESS FOR THE PREPARATION OF ELASTIC POLYURETHANE FLEXIBLE FOAMS USABLE IN COLD-MOLD TECHNIQUES TO PRODUCE MOLDED ARTICLES

BACKGROUND OF INVENTION

1. Field of Invention

This invention describes a process to prepare elastic polyurethane flexible foams usable in a cold-molding technique to produce molded articles with good mechanical properties. In particular the invention discloses a process to produce polyurethane molded articles with the lowest possible density and with the highest possible level of mechanical properties as manifested by high elongation, tensile strength, tear strength, and compression under load.

Elastic polyurethane flexible foam articles can be produced in open or closed molds. When molded articles are produced in closed molds, hot or cold foaming techniques can be used with polyether polyols, organic polyisocyanates and various reactants.

Polyurethane foam systems usable in hot and cold molds differ from one another, not only in the starting materials and process techniques, but also in their mechanical properties. Hot foam systems offer advantages in compression/density ratios and in elongation properties of the resultant foam. In a cold foam system the components react fully in a short time without the need for a reheating process, so that comparatively short mold resident times are possible in production of the molded article.

2. Description of Prior Art

The preparation of flexible polyurethane foams from organic polyisocyanates, polyols, blowing agents, catalysts, optionally chain extenders or crosslinking agents, auxiliaries and additives is known in numerous patents and other publications. We might refer, for example, to the monographs by J. H. Saunders and K. C. Frisch, *Polyurethanes*, Vol. 16 of High Polymers, PTS. 1 and 2 (New York: Interscience Publishers) and R. Vieweg and A. Hochtlen, *Polyurethane*, Vol. 7 of *Kunststoff-Handbuch* (Munchen 1966: Carl Hanser Verlag, 1966).

Flexible elastic polyurethane foam articles—their production, processing techniques, and properties—are described, for example, in *Polyurethane*, vol. 7 of *Kunststoff-Handbuch*, ed. Dr. J. Oertel (Munchen, Vienna: Carl Hanser Verlag, 1983) : 212 ff.

SUMMARY OF INVENTION

The object of the invention is a process to prepare elastic polyurethane flexible foam usable in energy-saving cold-molding techniques, without affecting the mechanical properties of the resultant molded article. Advantages inherent in the process of the invention include elimination of the high halogenated hydrocarbon content in the physically active blowing agents, thereby minimizing the high cost for the industrial recovery of such compounds. In addition, cost-intensive process techniques, for example, molding under vacuum, which requires complex fixtures, specific formulations, and exact process control during the manufacturing process is not practiced by the process of the invention. Specifically, the invention relates to a process for the preparation of elastic polyurethane flexible foam usable in cold molding techniques to produce molded articles comprising reacting (A) an organic polyisocyanate prepolymer
(B) a compound containing a reactive hydrogen atom comprising a mixture of
 (a) a di- to tetrafunctional polyether polyol having less than 10 percent by weight, preferably from 4 to 8 percent by weight, terminal oxyethylene groups, based on the total content of oxyethylene groups and a hydroxyl number of 20 to 80, preferably from 25 to 60,
 (b) an alkanolamine, and
 (c) from 10 to 25 percent by weight, preferably from 12 to 20 percent by weight water, based on the total weight of the mixture,
(C) a blowing agent,
(D) a catalyst, and optionally,
(E) auxiliaries and/or additives.

DESCRIPTION OF PREFERRED EMBODIMENT

The objective of the invention was unexpectedly met through reacting an organic polyisocyanate prepolymer and a special mixture of compounds containing reactive hydrogen atoms.

The process of the invention permits the production of elastic, low-density flexible polyurethane foam, preferably having a density less than 40 kg/m$^3$, which exhibits a high range of mechanical properties, in particular, high elongation and tensile strength. The foam produced by the process of the invention is usable in standard production devices used in cold-molding techniques, without the need to heat the molds once it has been filled with an expandable reaction mixture.

Polyisocyanate Prepolymers

In order to prepare the elastic polyurethane flexible foams usable in cold-molding techniques to produce a desirable molded article, according to the process of the invention, organic polyisocyanate polymers having an isocyanate content of from 6 to 20 percent by weight, preferably from 8 to 18 percent by weight, based on the total weight, are used as the polyisocyanate component (A). The organic polyisocyanate prepolymers are obtained by using conventional processes—for example at reaction temperatures of from 30° to 120° C. and reaction times of from 0.5 to 6 hours by reacting 2,4- or 2,6-toluene diisocyanates as well as various mixtures of these isomers particularly those in which the isomer weight ratio is from 80:20 to 65:35, and/or 4,4'- or 2,4'-diphenylmethane diisocyanates as well as various mixtures of these isomers - for example, those having a 4,4'-:2,4'-diphenylmethane diisocyanate ratio of from 100:25 to 100:100. The diphenylmethane diisocyanate isomers may contain up to 10 parts by weight tri- and-/or higher functionality polyphenylpolymethylene polyisocyanates per 100 parts by weight, and di- to tetrafunctional, optionally tri- to tetrafunctional polyether polyols having a hydroxyl number of from 20 to 50, preferably from 25 to 40 and having a terminal oxyethylene group content of from 10 to 30 percent by weight, preferably from 12 to 25 percent by weight, based on the total weight of oxyethylene alkylene groups, and at least 50 percent, preferably at least 65 percent, primary hydroxyl group. Toluene diisocyanate isomer mixtures have proven to be particularly effective in preparing the polyisocyanate prepolymers, and they are therefore preferred.

The polyether polyols which are suitable for preparing the polyisocyanate prepolymers or are suitable for use as componds containing reactive hydrogen atoms can be prepared using known methods—for example, through cationic polymerization using as catalysts: Lewis acids such as antimony pentachloride, borofluoride etherate etc., or modified bleaching earths; or through anionic polymerization using as catalysts: alkali hydroxides such as sodium or potassium hydroxide or alkali alcoholates such as sodium methylate, sodium or potassium ethylate, or potassium isopropylate. The polymerization reactions are performed with one or more alkylene oxides containing from 2 to 4 carbon atoms in the alkylene radical and, in the case of anionic polymerization, with an initiator which contains from 2 to 4 hydrogen atoms.

Suitable oxides are, for example, tetrahydrofuran, 1,3-propylene oxide, 1,2- and 1,3-butylene oxide, styrene oxide, and preferably 1,2-propylene oxide and ethylene oxide. The oxides may be used individually, alternately one after another, or as mixtures, where the polyether polyols used to prepare the polyisocyanate prepolymer must possess the terminal oxyethylene group content specified above. Typical initiators are: water, aliphatic and/or or aromatic, optionally, N-mono-, N,N- or N,N'-dialkyl-substituted diamines having from 1 to 4 carbon atoms in the alkyl radical, and from 2 to 12, preferably 2 to 6, carbon atoms in alkylene radical, and from 6 to 15, preferably from 6 to 13 carbon atoms in the arylene radical, for example, optionally mono- or dialkyl-substituted ethylenediamine diethylenetriamine, triethylenetetramine, 1.3-propylenediamine, 1.3- and 1.4-butylenediamine, 1.2-, 1.3-, 1.4-, 1.5- and 1.6-hexamethylenediamine, phenylenediamines, 2,4- and 2,6- toluenediamine and 4,4'-, 2,4'-, and 2,2'-diaminodiphenylmethane.

Typical initiators are also alkanolamine such as ethanolamine, diethanolamine, N-methyl- and N-ethylethanolamine, N-methyl- and N-ethyldiethanolamine, and triethanolamine, as well as ammonia. Preferably di- to quatra functional, more preferably tri- and/or quatra functional alcohols are used, such as ethanediol 1,2- 1,3-propanediol, diethylene glycol, dipropylene glycol, 1,4-butanediol, 1,6-hexanediol, glycerin, trimethylol propane, and pentaerythritol.

The polyether polyols may be used individually in the form of mixtures to prepare the prepolymers. Preferably, polyoxypropylene polyoxyethylene polyols initiated with trimethylolpropane or, preferably glycerin are used.

Compounds Containing Reactive Hydrogen Atoms

The suitable polyisocyanate prepolymers (A) are reacted with specially selected compounds having reactive hydrogen atoms (B) to prepare the flexible elastic polyurethane foams. The B component comprises a mixture of (a) at least one di- to tetrafunctional polyether polyol having less than 10 percent by weight preferably from 0 to 8 percent by weight and more preferably from 4 to 8 percent by weight terminal oxyethylene groups, whereby the percent by weight are based on the total weight of alkylene oxide groups, and having a hydroxyl number of from 20 to 80, preferably from 25 to 60, (b) at least one alkanolamine, and (c) from 10 to 25 percent by weight, preferably from 12 to 20 percent by weight water, based on the total weight of the mixture Preferably used are mixtures comprising (a) from 55 to 89.5 parts by weight, more preferably from 86 to 70 parts by weight of at least one polyether polyol, (b) from 0.5 to 20 parts by weight, preferably from 2 to 10 parts by weight of at least one alkanolamine, and (c) from 10 to 25 parts by weight, preferably from 12 to 20 parts by weight water.

The polyether polyol (B,a) which may be used individually or as mixtures, is prepared by known processes and may contain primary or secondary hydroxyl groups. Di- and/or trifunctional polyoloxypropylene polyoxyethylene polyols having from 4 to 8 percent by weight terminal ethylene oxide groups and hydroxyl numbers from 25 to 60 have been effectively used.

Preferably, di- and/or trialkanolamines having from two to three carbon atoms in the alkanol radical are used as the alkanolamines (B,b). Typical examples are: ethanolamine, 1,3-propanolamine, isopropanolamine, 1,3-dipropanolamine, di-isopropanolamine, 1,3-tripropanolamine, tri-isopropanolamine, and more preferably diethanolamine and/or triethanolamine. The alkanolamines may be used individually or in the form of mixtures.

In order to prepare the elastic polyurethane flexible foams, the organic polyisocyanate prepolymers (A) and compounds containing reactive hydrogen atoms (B) are reacted with the optional auxiliaries and additives (E) in such amounts that the isocyanate index is from 70 to 120, preferably from 80 to 110.

Blowing Agents

The water contained in the mixture of compounds having reactive hydrogen atoms (B) is used as the blowing agent (C). The water reacts with the polyisocyanate groups in starting component (A) to form amino end groups and carbon dioxide.

Physical blowing agents may also be used in addition to water—for example, to dilute and thus reduce the viscosity of the starting component (A), for example, halogenated hydrocarbons. Typical examples are methylene chloride, dichloro-difloromethane, dichloro-monofloromethane, dichloro-tetrafloroethane, 1,1,2-trichloro-1,1,2-trifloroethane, and preferably trichloroflormethane. However, the reaction is preferably conducted in the absence of halogenated hydrocarbons or other physical blowing agents.

Catalysts

In order to accelerate the reaction between the polyisocyanate prepolymer (A) and the mixture (B) conventional polyurethane catalysts are incorporated in the reaction mixture. Preferably used are basic polyurethane catalysts. For example tertiary amines such as dimethylbenzylamine, dicyclohexylmethylamine, dimethylcyclohexylamine, N,N,N',N'-tetramethyldiaminodiethyl ether, bis(dimethylaminopropyl) urea, N-methyl and N-ethyl morpholine, dimethylpiperazine, pyridine, 1,2-dimethylamidazol, 1-azabicyclo[3.3.0]octane, dimethylaminoethanol, N,N',N''-tris(dialkylaminoalkyl)hexahydrotriazines—for example, N,N',N''-tris(dimethylaminopropyl)-s-hexahydrotriazines, and more preferably triethylenediamine. Also suitable are metal salts such as iron II chloride, zinc chloride, lead octoate, and preferably tin salts such as tin dioctoate, tin diethylhexoate, and dibutyl tin dilaurate as well as more preferably mixtures of tertiary amines and organic tin salts. Preferably used are from 0.1 to 10 percent by weight, more preferably from 0.5 to 5 percent by weight catalyst based on tertiary amines and from 0.01 to 0.5 percent by weight, more preferably from 0.05 to 0.25 percent by weight metal salts, based on the weight of the polyisocyanate prepolymer (A).

Auxiliaries/Additives

Auxiliaries and/or additives (E) may optionally be incorporated in the reaction mixture. Typical examples are surfactants, foam stabilizers, cell opening regulators, fillers, dyestuffs, pigments, flame retardants, agents to prevent hydrolysis, fungistats and bacteriostats.

Surfactants which may be used are those which aid in homogenizing the initial materials and may also be suitable for regulating cell structure. Typical examples are emulsifiers such as the sodium salts of castor oil, of sulfates, or of fatty acids and salts of fatty acids with amines, for example, oleic acid diethylamine, or stearic acid diethanolamine. Additionally, salts of sulfonic acid, for example, alkali or ammonium salts of dodecylbenzinedisulfonic, dinaphthylmethanedisulfonic acid and castor oil. Foam stabilizers such as siloxane oxyalkylene heterol polymers and other organic polysiloxanes, oxyethylated alkyl phenol, oxyethylated fatty alcohols, paraffin oils, castor oil ester, ricinolic acid ester, and Turkey red oil, as well as cell regulators such as paraffins, fatty alcohols, and dimethylpolysiloxanes can be used. The surfactants are generally used in amounts from 0.01 to 5 parts by weight, based on 100 parts by weight of the polyisocyanate prepolymers.

Among the fillers, in particular reinforcing fillers, are the essentially known organic and inorganic fillers, reinforcing substances, weight-increasing substances and substances to improve the wear resistance of paints and coatings. Typical examples of inorganic fillers are silicate minerals, for example, lamellar silicates such as antigorite, serpentine, hornblends, amphibole, chrisotile, talcum, metal oxide such as kaolin, aluminum oxides, titanium oxides, and iron oxides, metal salts such as chalk, heavy spar and inorganic pigments such as cadmium sulfide, zinc sulfide, as well as powdered asbestos. Preferably used are kaolin (China Clay), aluminum silicate, and coprecipitates of barium sulfate and aluminum silicate, as well a natural and synthetic fibrous minerals like asbestos and wollastonite, as well as glass fibers of various length, which may optionally be sized. Typical organic fillers which may be used are coal, melamine, pine resin, cyclopentadienyl resins, and graft polymers based on styrene acrylonitrile prepared by in situ polymerization of acrylonitrile styrene mixtures in polyether polyols as described in German Pat. Nos. 11 11 394, 12 22 669 (U.S. Pat. Nos.3,304,273; 3,383,351; 3,523,093); 11 52 536 (GB No. 1,040,452); and 11 52 537 (GB No. 987,618), as well as filler polyols where aqueous polymer dispersions are converted to polyether polyol dispersions. Other organic fillers which can be used include polyoxyalkylene polyols or filler polyolyoxyalkylene polyamines, where aqueous polymer dispersions are converted to polyoxyalkylene polyol dispersions or polyoxyalkylene polyamine dispersions.

The inorganic and organic fillers may be used individually or in the form of mixtures. Preferably, stable filler polyether polyol dispersions are used in which the fillers are reduced to a particle size less than 7 mm in situ in the presence of polyoxyalkylene polyols by means of high localized energy densities and are dispersed at the same time. Filler polyether polyol dispersions of this type are described, for example, in German Published patent Applications OS No. 28 50 606, 28 50 610, and 29 32 304.

The inorganic and/or organic fillers are incorporated in the reaction mixture, preferably in amounts from 0.5 to 50 percent by weight, more preferably from 1 to 40 percent by weight, based on the weight of components (A) and (B).

Suitable flame retardants are, for example, tricresylphosphate, tris-2-chloroethyl phosphate, trischloropropyl phosphate, and tris-2,3-dibromopropyl phosphate.

In addition to the already cited halogen-substituted phosphates, inorganic flame retardants may also be used—for example, aluminum oxyhydrate, antimony trioxide, arsenic oxide, ammonium polyphosphate, and calcium sulfate, as well as esterification products of low molecular weight polyether polyols or polyfunctional alcohol, and halogenated phthalic acid derivatives may also be used to make the flexible polyurethane foams flame resistant. In general, it has been found to be desirable to use from 5 to 50 parts by weight, preferably from 5 to 25 parts by weight, of the cited flame retardants per 100 parts by weight of the starting components (A) and (B).

Additional information on the conventional auxiliaries and additives cited above may be found in the technical literature, for example the monograph by J. H. Saunders and K. C. Frisch, *Polyurethanes*, PTS.1 and 2, Vol. 16 of *High Polymers* (Interscience Publishers: 1962, 1964).

Process of the Invention

In order to prepare the elastic polyurethane flexible foams of the invention, the starting components (A), (B), and (D) as well as optionally (E) are mixed at temperatures of approximately 15° to 60° C., preferably from 20° to 50° C., the reaction mixture is fed into an open mold, and allowed to cure at a mold temperature of from 25° to 80° C., preferably from 40° to 65° C. in the open or, preferably, in the subsequently closed mold. The resulting molded articles may be removed from the mold after a residence time of approximately 2 to 10 minutes.

When a mixing device having several feed nozzles is used, the starting components may be added individually and mixed intensively in the mixing chamber. However, it has been found to be particularly desirable to use a two-component process in which starting components (B), (D), and optionally (E), are combined in I component and the isocyanate prepolymers (A) are used as the II component. This is therefore the preferred process. Here the advantage is that the I and II components can be transported in a space saving manner and can be stored over a certain time period, so that they merely need to be mixed intensively in order to prepare the flexible elastic polyurethane foams.

Preferably, temperature-controlled metal or aluminum cast molds are used as the molding tools. However, plastic tools may also be used—for example those made of fiber-reinforced unsaturated polyester or epoxy resins. Since the cold molding foams may be produced under compression—for example with a compression factor of from 1.1 to 1.5, the mold tool may optionally possess compression stability.

The elastic polyurethane flexible foams prepared in the process of the invention possess densities from 25 to 60 kg/m$^3$, preferably from 25 to 40 kg/m$^3$, and they are characterized by very good mechanical properties, in particular, by a very high tensile strength and increased elongation.

The elastic polyurethane flexible foams are suitable for use in upholstered furniture, mattresses, automobile seat cushions, and headrests.

EXAMPLES

The Examples which follow illustrate the invention. All parts and percentages are by weight unless stated otherwise. Starting components (B), (D), and optionally (E) are combined in I component. Starting component (A) is the II component. Polyisocyanate prepolymer A, B, and C were used as component II. The following discloses the preparation of the three polyisocyanate prepolymers, II component.

Polyisocyanate Prepolymer A

The prepolymer is prepared by reacting 28 parts by weight of a glycerin-initiated polyoxypropylene polyoxyethylene triol with 20 percent by weight polymerized ethylene oxide units in the terminal block, a hydroxyl number of 28, and 80 percent primary hydroxyl groups with 14.7 parts by weight of a 2,4- and 2,6-toluene diisocyanate isomer mixture in a weight ratio of 80:20 while stirring at 80° C. over a period of 2 hours.

The resulting polyisocyanate prepolymer A has a polyisocyanate content of 15.1 percent by weight and a viscosity of 807 mPas at 25° C.

Polyisocyanate Prepolymer B

The prepolymer is prepared by reacting a mixture of 21.6 parts by weight of the polyoxypropylene polyoxyethylene triol described in the preparation of polyisocyanate prepolymer A and 7.2 parts by weight of a graft polyether polyol having a functionality of 2.4, 15 percent by weight polymerized ethylene oxide units in the terminal block, a hydroxyl number of 28, and a styrene/acrylonitrile copolymer content of 21 percent by weight, with 19.5 parts by weight of a 2,4- and 2,6-toluene diisocyanate isomer mixture in a weight ratio of 80:20 while stirring at 80° C. in 2 hours.

The resulting polyisocyanate prepolymer B has an isocyanate content of 17.1 percent by weight and a viscosity of 715 mPas at 25° C.

Isocyanate Prepolymer C

The prepolymer is prepared by reacting 64.9 parts by weight of a polyoxypropylene diol having a hydroxyl number of 42 and 5 percent primary hydroxyl groups with 35.1 parts by weight of 2,4- and 2,6-toluene diisocyanate isomer mixture in a weight ratio mixture of 80:20 while stirring at 70° C. for 3 hours.

The resulting polyisocyanate prepolymer C has an isocyanate content of 15.2 percent by weight and a viscosity of 764 mPas at 25° C.

EXAMPLE 1

I Component: mixture of
69.62 parts by weight of a glycerin-initiated polyoxypropylene polyoxyethylene triol having 6 percent by weight polymerized terminal ethylene oxide units and a hydroxyl number of 56,
4.64 parts by weight diethanolamine,
1.86 parts by weight triethanolamine,
1.58 parts by weight triethanolamine (33 percent by weight in dipropylene glycol),
0.92 parts by weight bis(dimethylaminoethyl)ether,
16.72 parts by weight water, and
4.65 parts by weight of a silicone stabilizer
II Component:
Polyisocyanate Prepolymer A 100 parts by weight of the I Component and 600 parts by weight of the II Component were mixed intensively at room temperature. 673 g of this expandable reaction mixture were charged into a mold which was heated to 50° C. and whose inside dimensions were 40×40×10 cm. The mixture wa allowed to expand in the mold.

The resulting foam exhibited the following mechanical properties:
density per DIN 53 420 [g/l]: 39
elongation per DIN 53 571 [%]: 162
tensile strength per DIN 53 751 [kPa]: 130

COMPARISON EXAMPLE I

I Component: mixture of
69.62 parts by weight of a glycerin-initiated polyoxypropylene polyoxyethylene triol having 6 percent by weight terminal ethylene oxide units and a hydroxyl number of 56,
393.4 parts by weight of a glycerin-initiated polyoxypropylene polyoxyethylene triol having 20 percent polymerized ethylene oxide units in the terminal block, a hydroxyl number of 28, and 80 percent primary hydroxyl groups,
4.65 parts by weight diethanolamine,
1.86 parts by weight triethanolamine,
1.58 parts by weight triethylenediamine (33 percent in dipropylene glycol),
0.92 parts by weight bis(dimethylaminoethyl)ether,
16.75 parts by weight water, and
4.65 parts by weight of a silicone stabilizer
II Component:
2,4- and 26-toluene diisocyanate isomer mixture in an 80:20 weight ratio
493.4 parts by weight of the I Component and 206.6 parts by weight of the II Component were mixed intensively at room temperature and foamed as in Example 1.

The resulting foam exhibited the following mechanical properties:
density per DIN 53 420 [g/l]: 39
elongation per DIN 53 571 [%]: 141
tensile strength per DIN 53 751 [kPa]: 120

The comparison examples show that when toluene diisocyanate is used instead of the polyisocyanate prepolymer, the resulting foam has poor elongation and tensile strength.

EXAMPLE 2

I Component: mixture of
76.2 parts by weight of a glycerin-initiated polyoxypropylene polyoxyethylene triol having a hydroxyl number of 56 as in Example 1,
3.0 parts by weight diethanolamine,
2.0 parts by weight triethanolamine,
1.0 parts by weight triethylenediamine (33 percent in dipropylene glycol),
1.0 parts by weight bis(dimethylaminoethyl)ether,
13.3 parts by weight water, and
3.5 parts by weight silicone stabilizer
II Component:
Polyisocyanate Prepolymer A 100 parts by weight of the I Component and 385 parts by weight of the II Component were mixed intensively at room temperature. 568 g of this expandable reaction mixture was allowed to expand as described in Example 1 in the mold described therein.

The resulting foam exhibited the following mechanical properties:
density per DIN 53 420 [g/l]: 33
elongation per DIN 53 571 [%]: 189
tensile strength per DIN 53 751 [kPa]: 110

COMPARISON EXAMPLE II

I Component: As in Example 2
II Component: Polyisocyanate Prepolymer C
100 parts by weight of the I Component and 380 parts by weight of the II Component were mixed intensively at room temperature and the expandable reaction mixture was charged into the mold described in Example 1.

The resulting foam fell after rising.

EXAMPLE 3

I Component: As in Example 1
II Component: Polyisocyanate Prepolymer B
100 parts by weight of the I Component and 395 parts by weight of the II Component were mixed intensively at room temperature. 627 g of this expandable reaction mixture was allowed to expand in a mold whose temperature was controlled at 45° C. and whose inside dimensions were 40×40×10 cm. The mold was closed during expansion.

A resulting foam exhibited the following mechanical properties:
density per DIN 53 420 [g/l]: 36
elongation per DIN 53 571 [%]: 186
tensile strength per DIN 53 751 [kPa]: 140

The embodiments of the invention in which an exclusive privilege or property is claimed are defined as follows:

1. A process for the preparation of elastic polyurethane flexible foams comprising reacting
(A) an organic polyisocyanate prepolymer
(B) a compound having reactive hydrogen atoms comprising a mixture of
  (a) at least one di- to tetrafunctional polyether polyol having less than 10 percent by weight terminal oxyethylene groups based on the total content of said groups and having a hydroxyl number of from 20 to 80,
  (b) an alkanolamine, and
  (c) from 10 to 25 percent by weight water, based on the total weight of the mixture,
(C) a blowing agent, and
(D) a catalyst.

2. The process for the preparation of elastic polyurethane flexible foams of claim 1 wherein auxiliaries and additives are added to the reaction components.

3. The process for the preparation of elastic polyurethane flexible foams of claim 1 wherein said compound having reactive hydrogen atoms (B) comprises a mixture comprising
(a) from 55 to 89.5 parts by weight of at least one di- to tetrafunctional polyether polyol having less than 10 percent by weight terminal oxyethylene groups and a hydroxyl number from 20 to 80,
(b) from 0.5 to 20 parts by weight of at least one alkanolamine, and
(c) from 10 to 25 parts by weight water, based on the total weight of the mixture.

4. The process for the preparation of elastic polyurethane flexible foams of claim 1 wherein the organic polyisocyanate prepolymer (A) has an isocyanate content of from 6 to 20 percent by weight and is prepared by reacting toluene diisocyanates and/or diphenylmethane diisocyanates with at least one di- to tetrafunctional polyether polyol having a hydroxyl number of from 20 to 50 and a terminal oxyethylene group content of at least 10 to 30 percent by weight and at least 50 percent primary hydroxyl groups.

5. The process for the preparation of elastic polyurethane flexible foams of claim 1 wherein di- and/or trialkanolamines having 2 to 3 carbon atoms in the alkylene radical are used as the alkanolamines (B,b).

6. The process for the preparation of elastic polyurethane flexible foams of claim 1 wherein the isocyanate index is from 70 to 120.

7. The process for the preparation of elastic polyurethane flexible foams of claim 1 wherein the reaction is performed in the absence of halogenated hydrocarbons as a blowing agent.

8. The process for the preparation of elastic polyurethane flexible foams of claim 1 wherein the reaction is performed in a closed mold at a temperature range of 25° to 80° C.

9. The process of claim 1 wherein the elastic polyurethane flexible foam has a density of from 25 to 60 kg/m$^3$.

10. An elastic polyurethane flexible foam with a density of from 25 to 60 kg/m$^3$, obtained by the processes of claims 1 through 6.

11. An elastic molded article comprising a polyurethane flexible foam with a density from 25 to 60 kg/m$^3$, obtained in closed molds by the processes of claims 1 through 7.

* * * * *